(12) United States Patent
Hong

(10) Patent No.: US 6,369,983 B1
(45) Date of Patent: Apr. 9, 2002

(54) WRITE HEAD HAVING A DRY-ETCHABLE ANTIREFLECTIVE INTERMEDIATE LAYER

(75) Inventor: Liubo Hong, San Jose, CA (US)

(73) Assignee: Read-Rite Corporation, Milpitas, CA (US)

(*) Notice: Subject to any disclaimer, the term of this patent is extended or adjusted under 35 U.S.C. 154(b) by 0 days.

(21) Appl. No.: 09/374,591

(22) Filed: Aug. 13, 1999

(51) Int. Cl.[7] ............................. G11B 5/31; G11B 5/17
(52) U.S. Cl. ................................. 360/126; 360/123
(58) Field of Search .................................. 360/126, 123

(56) References Cited

U.S. PATENT DOCUMENTS

| 5,059,278 A | * | 10/1991 | Cohen et al. ............... 360/123 |
| 5,738,931 A | * | 4/1998 | Sato et al. |
| 5,742,459 A | * | 4/1998 | Shen et al. |
| 6,074,566 A | * | 6/2000 | Hsiao et al. ............... 360/126 |
| 6,185,068 B1 | * | 2/2001 | Fujita et al. ............... 360/123 |
| 6,195,872 B1 | * | 3/2001 | Sasaki |
| 6,260,256 B1 | * | 7/2001 | Sasaki |

* cited by examiner

*Primary Examiner*—Craig A. Renner
(74) *Attorney, Agent, or Firm*—Sawyer Law Group LLP

(57) ABSTRACT

A method and system for providing a write head is disclosed. The write head includes at least one pole and an insulating layer. The at least one pole is for writing magnetic data. The method and system include providing an intermediate layer and providing at least one conductive coil. The intermediate layer is disposed between the insulating layer and the at least one conductive coil. The intermediate layer is composed of at least one material capable of being dry etched. The at least one conductive coil is in proximity to the at least one pole and is for carrying a current to energize the at least one pole during writing.

9 Claims, 10 Drawing Sheets

WRITE HEAD HAVING A DRY-ETCHABLE ANTIREFLECTIVE INTERMEDIATE LAYER

FIELD OF THE INVENTION

The present invention relates to magnetic recording technology and more particularly to a method and system for providing a glue layer and seed layer for the coil of a write head.

BACKGROUND OF THE INVENTION

Magnetic data is typically stored on a magnetic recording medium, such as a disk, using a conventional write head. The conventional write head may be a separate head, but is typically part of a conventional merged head. FIG. 1A depicts a conventional merged head 10. The conventional merged head 10 typically includes a read head 11 for reading magnetic data and a conventional write head 19. The conventional read head includes a first shield 12, first and second gaps 14 and 18, respectively, and a magnetoresistive sensor 16. The magnetoresistive sensor 16 is typically a giant magnetoresistance sensor, such as a spin valve. The conventional read head 11 also includes a first pole/second shield 20 ("first pole"). Although used in writing, the first pole 20 also acts as a shield for the conventional read head 11.

The conventional write head 19 is typically an inductive head, including the first pole 20 and a second pole 26. The second pole 26 is typically grown on a seed layer 24. The first pole 20 and second pole 26 are separated by a write gap 22. The write head also typically includes one or more conventional coils 30 which are used to carry current. Two conventional coils 30 are depicted in FIG. 1A. When energized by the current driven through the conventional coils 30, the first and second poles 20 and 26 generate a magnetic field in the write gap. When brought into proximity with the disk or other recording media, the magnetic field writes data to the disk.

FIG. 1B depicts the coils 30 and the surrounding part of the conventional write head 19. The conventional coils 30 include two conventional coils, 30-1 and 30-2, having six turns each. The conventional coils 30 are insulated from the first pole 20, the second pole 26, and each other by conventional insulating layers 32, 40, and 42. Each conventional coil 30-1 and 30-2 includes a conventional conductive layer 38 and 48, respectively, that are typically made of copper. Each of the copper layers 38 and 48 is grown on a conventional seed layer 36 and 46, respectively. The conventional seed layers 36 and 46 are also typically made of copper. The conventional seed layers 36 and 46 are grown on conventional glue layers 34 and 44, respectively. The conventional glue layers 34 and 44 promote adhesion between the corresponding conventional coil 30-1 and 30-2 and the insulating layers 32 and 40, respectively. The conventional glue layers 34 and 44 are typically composed of titanium. Thus, the conventional seed layers 36 and 46 and the conventional glue layers 34 and 44 may carry some current driven through the conventional coils 30-1 and 30-2, respectively.

In order to form the conventional coils 30 for the write head 19, photolithography is typically used. FIG. 2 depicts a conventional method 50 for forming one of the conventional coils 30. Although the method 50 can be used for either conventional coil 30-1 or 30-2, FIG. 2 will be explained in the context of providing the first conventional coil 30-1. FIGS. 3A through 3D depict a portion of the conventional write head 19 during formation of the conventional coil 30-1. Referring now to FIGS. 2 and 3A–3D, the conventional glue layer 34 is provided on the conventional insulating layer 32, via step 52. Thus, step 52 typically includes depositing a layer of Ti on the conventional insulating layer 32. The conventional glue layer 34 promotes adhesion to the insulating layer 32. The conventional seed layer 36, which is typically made of Cu, is then provided on the conventional glue layer 34, via step 54. FIG. 3A depicts the conventional insulating layer 32, conventional glue layer 34, and conventional seed layer 36 after step 54 is performed. A resist structure is provided on the conventional seed layer 36, via step 56. FIG. 3B depicts a portion of the conventional write head 19 after the resist structure 37 is provided. The lines in the resist structure 37 cover the portions of the conventional seed layer 36 above which an insulator will be used to separate turns of the conventional coil 30-1. The resist structure 37 thus includes apertures in areas in which the conventional coil 30-1 will be formed. The conventional coil 30-1 is then deposited, via step 58. Step 58 is typically performed by plating the copper layer 38 onto the conventional seed layer 36. The resist structure 37 is then stripped, via step 60. FIG. 3C depicts the conventional coil 30-1 including copper layer 38. The portions of the conventional seed layer 36 and the conventional glue layer 34 between the turns of the conventional copper coil 38 are then wet etched, via step 62. The wet etch ensures that the turns of the conventional coils 30-1 and 30-2 are insulated from each other. FIG. 3D depicts the conventional coil 30-1 after the conventional seed layer 36 and conventional copper layer 34 have been etched.

One of ordinary skill in the art will readily realize that the trend in magnetic recording is toward higher data transfer rates. Reducing the length of the conventional write head 11, especially the length of the poles 20 and 26, can reduce the head inductance. Thus, the flux rise time is decreased and the data transfer rate can be increased. In order to reduce the length of the poles 20 and 26, either the turns of the coils 30 are more densely packed or the ability of the coils to carry increased current is increased. Thus, the pitch of the coils 30 is desired to be decreased and the aspect ratio of the coils 30 is desired to be increased. The aspect ratio is the ratio of the height of a turn of the coils 30 to the width along the length of the poles 20 or 26 of a turn of the coils 30. The pitch is the width of the coil plus the distance between turns of the coils 30. The pitch or aspect ratio is changed because decreasing the total cross-sectional area of the coils 30 (height multiplied by width) results in excessive electrical resistance and, therefore, excessive heating.

Although it would be desirable to more densely pack the turns of the coils 30, use of the conventional seed layers 36 and 46 and the conventional glue layers 34 and 44 limit the ability to reduce the length of the poles 20 and 26. Conventional photolithography results in the resist structure 37 having lines that are separated by a particular width, currently approximately 0.4 µm. Conventional photolithography may be limited in the width provided by reflective effects. For example the swing curve effect and resist notching alter the resist pattern due to light reflected off of layers beneath the resist structure 37. Thus, portions of the copper layers 28 and 48 are separated by a given distance prior to etching of the conventional seed layer 36 or 46 and the conventional glue layer 34 or 44. The wet etch which is used to etch the conventional seed layers 36 and 46 and the conventional glue layers 34 and 44 limits the pitch of the coils 30. The wet etch of step 62 etches not only the conventional seed layer 36 and 46 and conventional glue layers 34 and 44, but also etches the copper layers 38 and 48. The wet etch is also isotropic. Thus, both the height and width of the copper layers 38 and 48 are reduced by the wet etch. This reduction in the height and width of the copper layers 38 and 48 can be seen in FIGS. 3C and 3D. For example, if the seed layer 36 or 46 is approximately 0.1 μm thick, a wet etch which etches through the conventional seed layer 36 or 46 may reduce the height of the copper layer 38 or 48 by 0.1 μm and increase the distance between turns of the coils 30 by 0.2 μm. Given that the distance between the turns for the copper layer 38 or 48 for some photolithographic processes is approximately 0.4 μm prior to the wet etch, the affect of the wet etch on the coils 30 can be significant. Consequently, both the resistance of the coils 30 for a particular resist structure 37 and the distance between turns of the coils 30 are increased. Furthermore, the aspect ratio of the coils 30 is also increased. The ability of the coils 30 fabricated at the desired pitch and aspect ratio to allow for a reduced pole length may be compromised. Thus, the wet etch reduces a manufacturer's ability to provide a conventional write head 19 having increased data transfer rates.

The wet etch also affects the yield for the conventional coils 30 and, therefore, the conventional head 10. The wet etch step 62 often results in an undercut of the conventional seed layers 36 and 46 and the conventional glue layers 34 and 44. In other words, the width of the copper layer 38 or 48 is larger than the widths of the conventional seed layer 36 or 46 and the conventional glue layer 34 or 44. The undercut occurs because the wet etch is substantially isotropic. Thus, the wet etch not only etches vertically into the conventional seed layers 36 and 46 and the conventional glue layers 34 and 44, but also horizontally along the conventional seed layers 36 and 46 and the conventional glue layers 34 and 44. The undercut is depicted in FIGS. 1B and 3D. Because of the undercut, the conventional copper layer 38 or 48 may move more readily than if the widths of the conventional seed layer 36 or 46 and the conventional glue layer 34 or 44 were approximately the same as for the conventional copper layer 38 or 48. The turns of the conventional coils 30 may move enough to touch each other. Thus, one or more turns of the conventional coils 30 may be shorted. The conventional coils 30 and, therefore, the conventional write head 19 may be unusable. Consequently, the yield of the conventional write head 19 is reduced.

Accordingly, what is needed is a system and method for improving the data transfer rate of a write head. It would also be desirable if the method and system resulted in a higher yield or simplified processing of the head. The present invention addresses such a need.

SUMMARY OF THE INVENTION

A method and system for providing a write head is disclosed. The write head includes at least one pole and an insulating layer. The at least one pole is for writing magnetic data. The method and system comprise providing an intermediate layer and providing at least one conductive coil. The intermediate layer is disposed between the insulating layer and the at least one conductive coil. The intermediate layer is composed of at least one material capable of being dry etched. The at least one conductive coil is in proximity to the pole and is for carrying a current to energize the pole during writing.

According to the system and method disclosed herein, the present invention provides a mechanism for providing the coil(s) of the write head. Because the intermediate layer can be dry etched, overetching of the coils and undercutting of layers under the coils is reduced or substantially eliminated. Thus, write heads having higher data transfer rates and higher yields may be provided.

DETAILED DESCRIPTION OF THE INVENTION

Figure 1A:
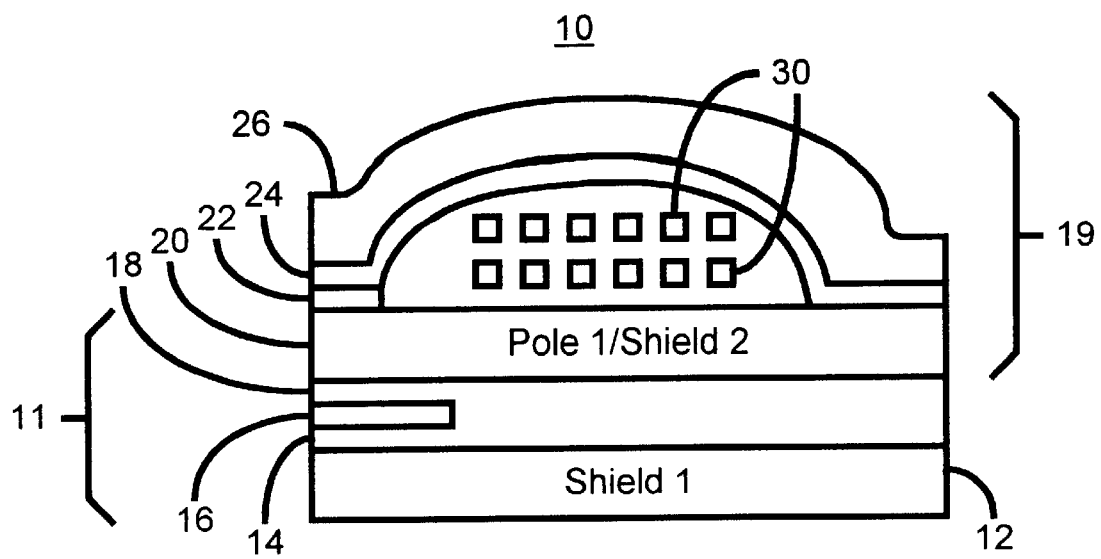
FIG. 1A is a diagram of a side view conventional merged head including a write head and a read head.

The present invention relates to an improvement in magnetic recording technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Conventional write heads are used to write data to magnetic recording media. A conventional write head typically includes a pair of poles which are separated by a write gap and two conventional coils. Each of the coils is typically made of copper that is plated onto a conventional copper seed layer. The conventional seed layer is typically grown on a conventional glue layer. The conventional glue layer is typically made of titanium and promotes adhesion between the coil and an underlying insulating layer. When energized by a current driven through the conventional coils, the pair of poles generate a magnetic field in the write gap, allowing the conventional write head to write magnetic data onto a recording media.

The current trend in magnetic recording technology is toward smaller bit size and higher data transfer rates. In order to increase the data transfer rates, length of the poles is desired to be decreased. To decrease the length of the poles, the spacing between turns of the conventional coils is decreased or the aspect ratio (height divided by width) of the coils is desired to be increased. However, one of ordinary skill in the art will readily realize that conventional processing techniques used in providing the conventional coil have limitations. In particular, a wet etch of the conventional seed layer and conventional glue layer is used to ensure that the turns of the coil are not shorted. The wet etch is used in part because the conventional seed or glue layers may be resistant to other mechanisms for removal. This wet etch is isotropic and acts upon the copper layer of the coil. The wet etch also etches a portion of the height and width of the conventional copper coil. Thus, the spacing between the turns of each conventional coil is increased, while the height is decreased. This makes it difficult to reduce the length of the poles. Thus, one of ordinary skill in the art will readily realize that the ability of a manufacturer to provide a conventional write head having a higher data transfer rate is decreased.

Furthermore, the conventional write head may have reduced yield at lower coil pitches. Because the wet etch is isotropic, the wet etch typically results in an undercutting of the conventional seed layer and the conventional glue layer. The small width of the conventional seed and glue layers make the conventional coil more likely to move. Consequently, turns of the conventional coil are more likely to be shorted, rendering the conventional write head unusable. Thus, the yield for the conventional write head is also reduced.

A method and system for providing a write head is disclosed. The write head includes at least one pole for writing magnetic data. The method and system comprise providing an insulating layer, providing an intermediate layer, and providing at least one conductive coil. The intermediate layer is disposed above the insulating layer. The intermediate layer is composed of at least one material capable of being dry etched. The at least one conductive coil is in proximity to the pole and is for carrying a current to energize the at least one pole during writing.

The present invention will be described in terms of a merged head having specific components. However, one of ordinary skill in the art will readily recognize that this method and system will operate effectively for other write heads. Similarly, one of ordinary skill in the art will readily recognize that the present invention will operate effectively for other configurations of write heads. The present invention will also be described in the context of specific materials. However, one of ordinary skill in the art will readily realize that the present invention can be used with other materials having the desired characteristics.

Figure 4A:
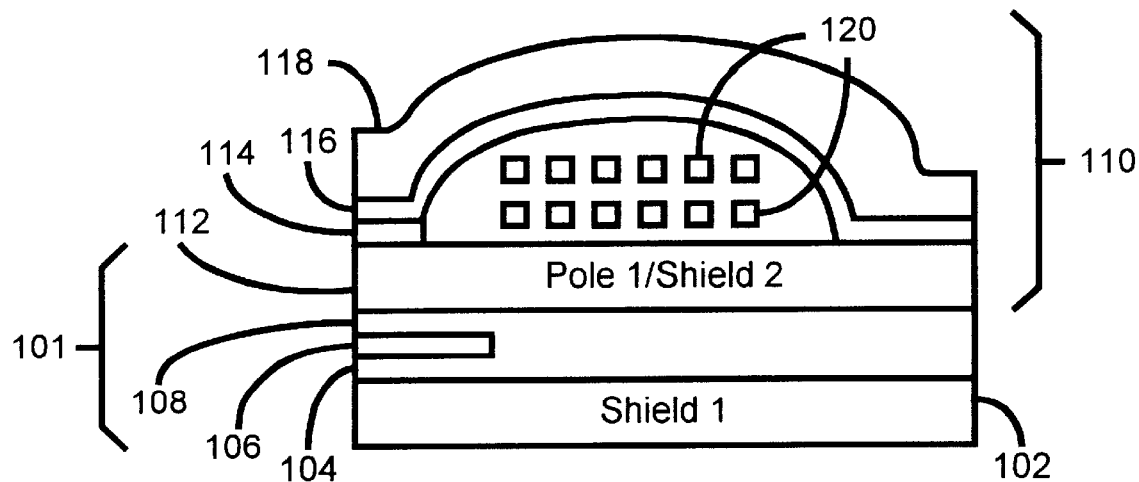
FIG. 4A is a diagram of a side view merged head including a read head and a write head in accordance with the present invention.

To more particularly illustrate the method and system in accordance with the present invention, refer now to FIG. 4A depicting a side view of one embodiment of a write head 110 in accordance with the present invention. The write head 110 is part of a merged head 100 which includes the write head 110 and a read head 101. The read head 101 includes a first shield 102, a first gap 104, a read sensor 106, a second gap 108, and the first pole/second shield (first pole) 112. The first pole 112 is also part of the write head 110. The write head 110 also includes a write gap 114, a seed layer 116, a second pole 118, and coils 120.

Figure 4B:
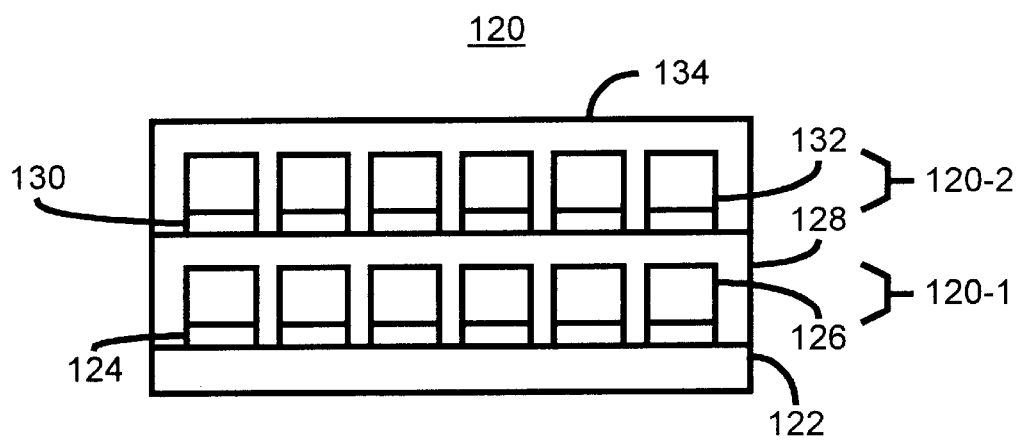
FIG. 4B is a side view of a portion of one embodiment of the write head in accordance with the present invention.

FIG. 4B depicts a more detailed side view of the coils 120 and a portion of the write head 110 surrounding the coils 120. The coils 120 includes two coils, 120-1 and 120-2, each having six turns. However, nothing prevents the use of another number of turns or coils. Each coil 120-1 and 120-2 includes a conductive layer 126 and 132, respectively. Preferably, the conductive layers 126 and 132 are copper. However, nothing prevents the use of another conductive material. The conductive layers are preferably approximately 1.5–2 $\mu$m thick. Each conductive layer 126 and 132 is grown above an intermediate layer 124 and 130, respectively. In a preferred embodiment, the conductive layers 126 and 132 are grown directly on the intermediate layers 124 and 130, respectively. The intermediate layers 124 and 130 are made of one or more materials which can be dry etched, for example by reactive ion etching (RIE). The intermediate layers 124 and 130 should also be capable of acting as a seed layer, a glue layer, or both for the conductive layers 126 and 132, respectively. In a preferred embodiment, the intermediate layers 124 and 130 function as both a glue layer and a seed layer. Also in a preferred embodiment, the intermediate layers 124 and 130 include TiN and are approximately 300–1000 Angstroms thick. In an alternate embodiment, the intermediate layers 124 and 130 include WN and are approximately 300–1000 Angstroms thick. The coils 120-1 and 120-2 are insulated by insulating layers 122, 128, and 134. For example, the insulating layers 122, 128, and 134 may each include an inorganic dielectric or cured photoresist. The intermediate layers 124 and 130 are grown on insulating layers 122 and 128, respectively.

Figure 1B:
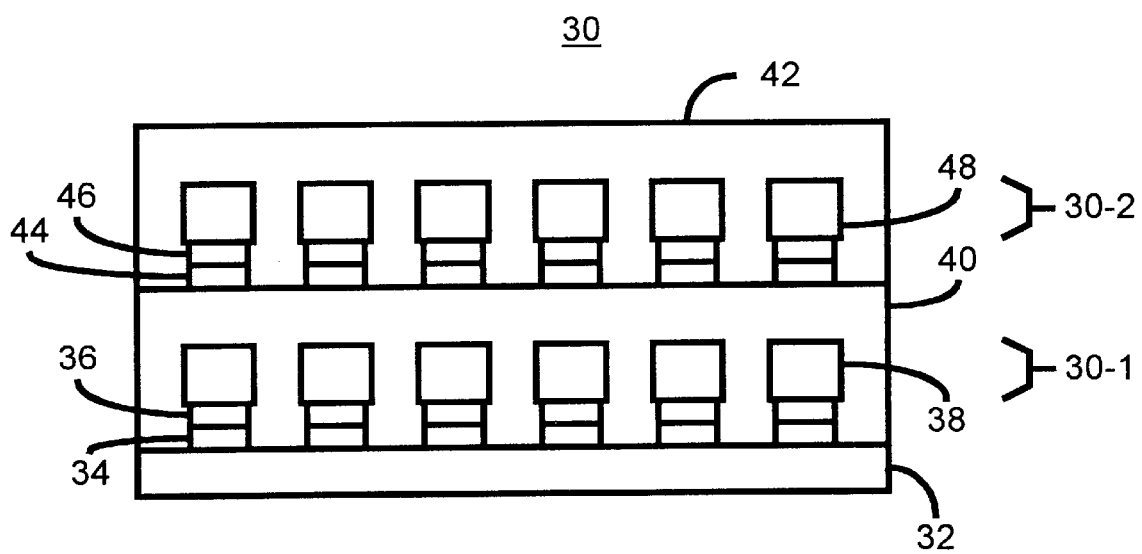
FIG. 1B is a side view of a portion of the conventional write head.

Because the intermediate layer can be dry etched, the wet etch step of the conventional method 50 is reduced in duration or, preferably, eliminated. Consequently, the reduction in height and width of the conductive layer 126 or 132 can be substantially reduced or eliminated. This is because the dry etch can be made anisotropic, reduce the thickness of the layer that is etched rather than the width, and because the copper that may be used in the conductive layer 126 or 132 is resistant to dry etching. The spacing between turns of the coils 120-1 and 120-2 can thus be significantly reduced. Thus, the length of the poles 112 and 118 can be reduced and the data transfer rate increased. Furthermore, there can be little or no undercutting of the intermediate layer 124 or 130, respectively. This is in contrast to the conventional seed layers 36 and 46 and the conventional glue layers 34 and 44 depicted in FIG. 1B. Referring back to FIGS. 4A and 4B, the intermediate layers 124 and 130 may improve the adherence of the coils 120-1 and 120-2 to the underlying insulating layers 122 and 128, respectively. Consequently, yield for the write head 110 can be increased. In addition, because only one intermediate layer 124 or 130 for each coil 120-1 or 120-2, respectively, may be provided, processing may be simplified.

Figure 5:
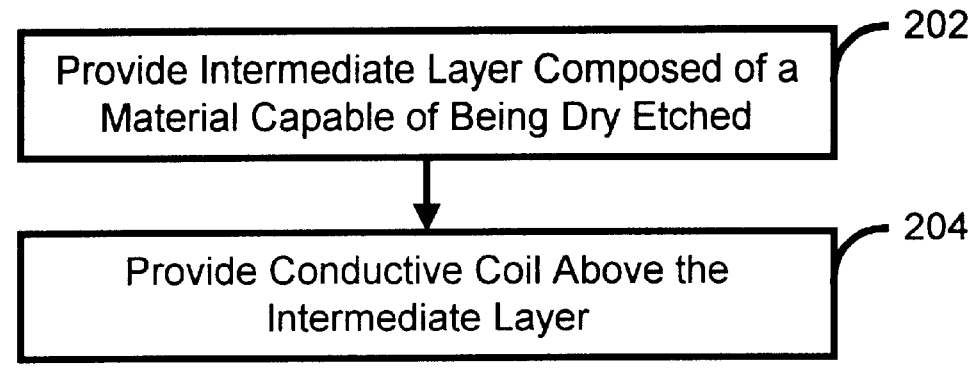
FIG. 5 is a high-level flow chart of one embodiment of a method in accordance with the present invention for providing the write head.

FIG. 5 is a high-level flow chart of a method 200 in accordance with the present invention for providing the coils 120 in a write head 110 in accordance with the present invention. The method 200 preferably commences after the insulating layer 122 or 128 has been provided. The intermediate layer 124 or 130 capable of being dry etched and preferably capable of acting as a seed and/or glue layer is provided, via step 202. Preferably, the intermediate layer 124 or 130 is TiN and is deposited on the insulating layer 122 or 128, respectively, for example by chemical vapor deposition or sputtering. The conductive layer 126 or 132 of the coil 120-1 or 120-2, respectively, is then deposited above the intermediate layer 124 or 130, respectively, via step 204. In a preferred embodiment, step 204 includes depositing the conductive layer 126 or 132 on the intermediate layer 124 or 130, respectively. Thus, in a preferred embodiment, the intermediate layer 124 or 130 acts as both a seed layer and a glue layer for the conductive layer 126 or 132, respectively. Because they are composed of one or more materials which can be dry etched, the intermediate layers 124 and 130 can later be dry etched substantially without affecting the conductive layer 126 or 132. This is because the conductive layers 126 and 132, particularly when made of copper, are highly resistant to dry etching.

Figure 6:
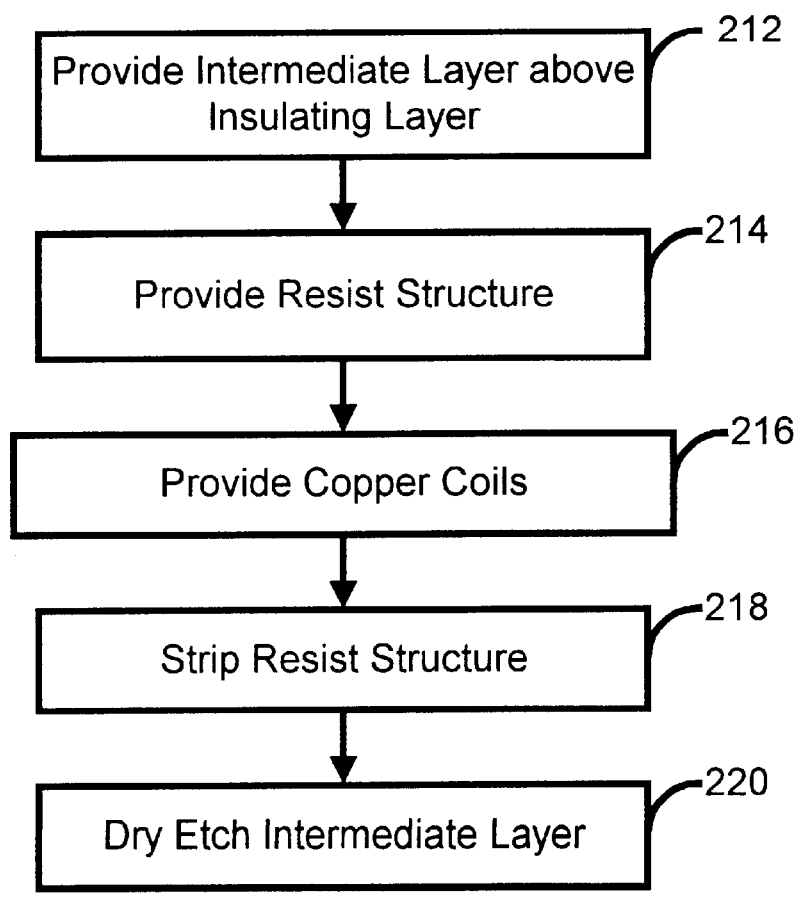
FIG. 6 is a more detailed flow chart of one embodiment of a method in accordance with the present invention for providing the write head.
Figure 7A:
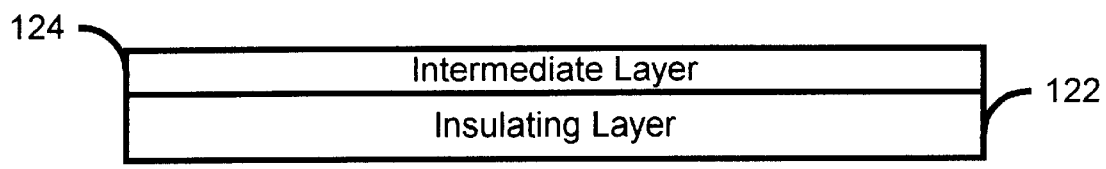
FIG. 7A is a diagram of a portion of one embodiment of the write head in accordance with the present invention after the intermediate layer is provided.

FIG. 6 depicts a more detailed flow chart of a method 210 in accordance with the present invention for providing a coil in a write head. FIG. 6 will be explained in conjunction with FIGS. 7A through 7D, which depict a portion of the write head 110 during formation of the coil 120-1. Note, however, that the method 210 could also be used to form the coil 120-2. Referring to FIGS. 6 and 7A–7D, the intermediate layer 124 capable of being dry etched and acting as a seed and/or glue layer is provided on the insulating layer 122, via step 212. Preferably, step 212 includes depositing a layer of TiN. In an alternate embodiment, step 212 includes depositing a layer of WN. FIG. 7A depicts the intermediate layer 124 and insulating layer 122. The intermediate layer 124 preferably functions as both a seed layer and a glue layer for the coil 120-1. In a preferred embodiment, therefore, copper can be plated onto the intermediate layer 124 and the intermediate layer 124 can help to ensure that the coil 120-1 adheres to the underlying insulating layer 122.

Figure 7B:
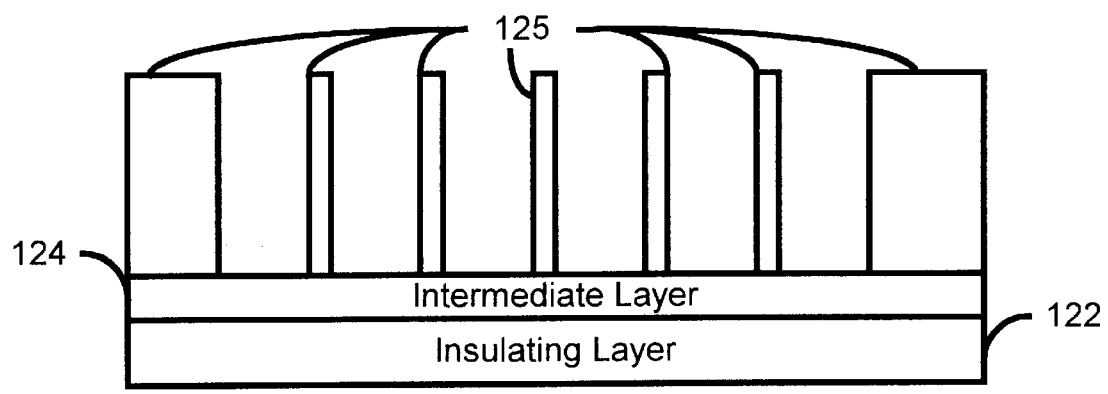
FIG. 7B is a diagram of a portion of one embodiment of the write head in accordance with the present invention after the resist structure is provided.

A resist structure is then provided, via step 214. The resist structure 125 is depicted in FIG. 7B. The resist structure 125 includes lines which obscure portions of the intermediate layer 124 that will be covered with an insulator to electrically insulate the turns of the coil 120-1. The resist structure 125 exposes portions of the intermediate layer 124 on which the coil 120-1 will be plated. The conductive layer 126 of the coil 120-1 is then provided, via step 216. Preferably step 216 includes plating the copper onto the intermediate layer 124. Plating of copper directly onto the intermediate layer 124 is possible because the intermediate layer 124 preferably also functions as a seed layer.

Figure 7C:
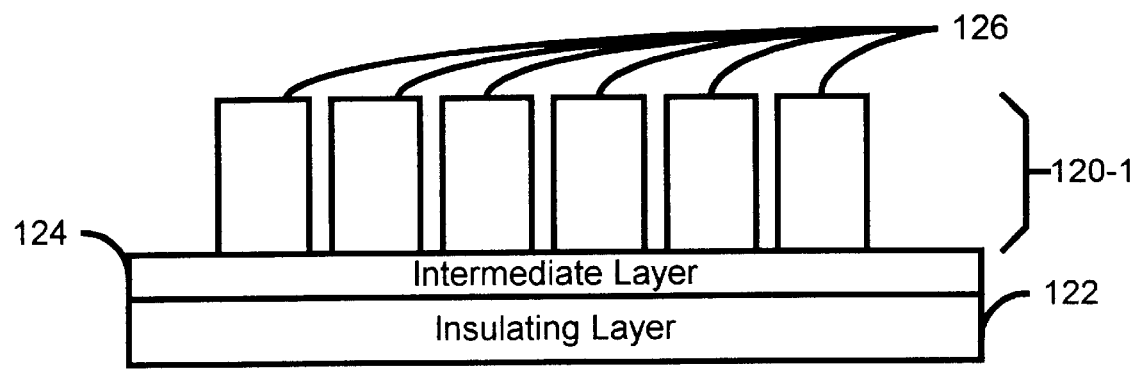
FIG. 7C is a diagram of a portion of one embodiment of the write head in accordance with the present invention after the resist structure had been stripped.
Figure 7D:
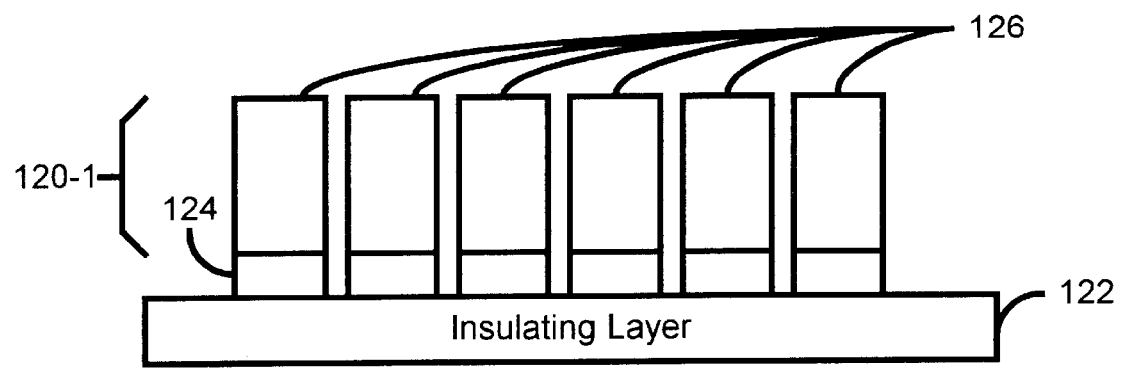
FIG. 7D is a diagram of a portion of one embodiment of the write head in accordance with the present invention after the dry etch of the intermediate layer.

The resist structure 125 is then stripped, via step 218. FIG. 7C depicts the coil 1201 after the resist structure 125 has been stripped. The turns in the coil 120-1 are physically separated along the length of the insulating layer 122, as depicted in FIG. 7C, However, the turns of the coil 120-1 may be electrically connected through the intermediate layer 124. Consequently, the intermediate layer 124 is dry etched, via step 220. If TiN is used as the intermediate layer 124, the dry etch would preferably use a fluorine or chlorine chemistry. The dry etch would also be anisotropic, etching more of a material vertically, towards the insulating layer 122, than horizontally along the surface of the insulating layer 122. Step 220 thus helps electrically isolate the turns of the coil 120-1. FIG. 7D depicts the coil 120-1 after step 220 is completed. Similarly, FIG. 4B depicts the coils 120-1 and 120-2 after step 220 has been completed for the coil 120-2 and the insulating layer 134 has been provided.

Because the intermediate layer 124 has been dry etched, there is less reduction in the width and height of the conductive layer 126 than in the conventional wet etch. In a preferred embodiment, there is substantially no change in the width and height of the copper conductive layer 126 when the intermediate layer 124 is dry etched. This is due in part to the fact that copper is extremely resistant to dry etching, such as reactive ion etching. In addition, the dry etch can be anisotropic, etching more in the vertical direction, into the thickness of the intermediate layer 124, than in the horizontal direction. This is in contrast to the wet etch, which is substantially isotropic. Consequently, the turns of the coils 120 can be more closely spaced and the height of the coils 120 can be better preserved. The length of the poles 112 and 118 can be reduced and the data transfer rate for the write head 110 can be increased.

Furthermore, the stability of the coils 120 is improved through the use of the intermediate layer 124 or 130. The dry etch can be anisotropic. Thus, the dry etch removes more of the intermediate layer 124 or 130 in a direction perpendicular to the surface of the intermediate layer 124 and insulating layer 122. As a result, the dry etch can reduce or substantially eliminate the undercutting of the intermediate layer 124 or 130. Because undercutting of the intermediate layer 124 or 130 is reduced or eliminated, the intermediate layer 124 or 130 can better function as a glue layer. Thus, the probability that a portion of the coils 120 will move and become shorted is reduced. Consequently, yield is improved.

The use of TiN, or another material which can be dry etched, acts as a seed and/or glue layer, and can act as an antireflective coating, as the intermediate layer 124 or 130 has an additional benefit. TiN can act as a bottom antireflective coating (BARC). TiN can thus reduce effects due to reflections off of lower layers. For example, resist notching, the removal of portions of the upper corners of lines in the resist structure 125 due to reflections during photolithography, is reduced. Similarly, the swing curve effect, the variation in the width of an opening in the resist structure 125 due to reflections, can also be reduced. Therefore, the ability to provide the desired resist structure 125 is improved when TiN or another material is used.

Figure 8A:
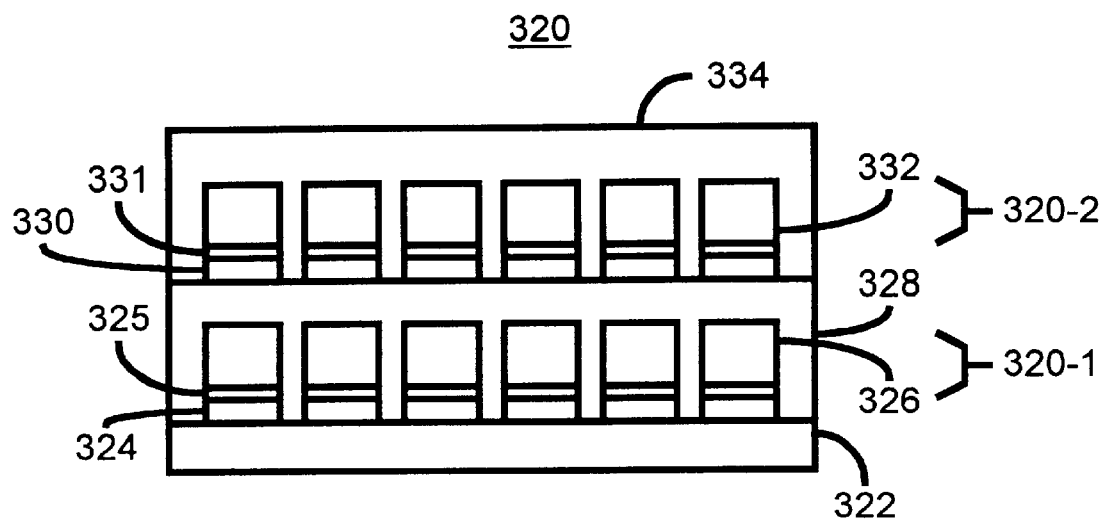
FIG. 8A is a diagram of a portion of a second embodiment of the write head in accordance with the present invention.
Figure 8B:
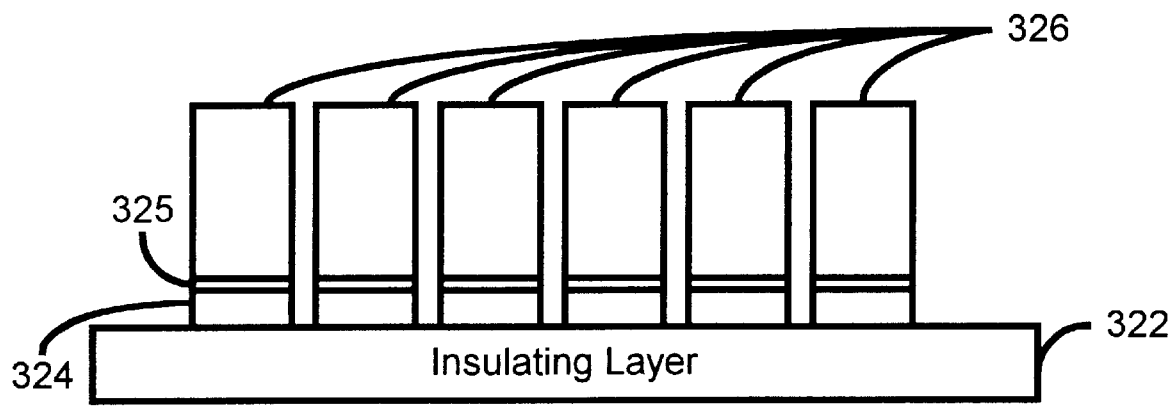
FIG. 8B is a diagram of a portion of the second embodiment of a write head in accordance with the present invention after the dry etch of the intermediate and seed layers.

FIGS. 8A and 8B depict a second embodiment of the coils 320 and a surrounding portion of the write head 110. FIG. 8A depicts coils 320-1 and 320-2. The coils 320-1 and 320-2 include a conductive layer 326 and 332, respectively. The conductive layers 326 and 332 correspond to the conductive layers 126 and 132, respectively. Thus, the conductive layers 326 and 332 are preferably copper. The conductive layers 326 and 332 are formed on seed layers 325 and 331. The seed layers 325 and 331 are preferably made of copper. The seed layers 325 and 331 are grown on intermediate layers 324 and 330. The intermediate layers 324 and 330 correspond to the intermediate layers 124 and 130, respectively. The intermediate layers 324 and 330, however, preferably function only as glue layers. The intermediately layers are grown on insulating layers 322 and 328, respectively. In addition, an insulating layer 334 insulates the coil 320-2 from the remainder of the write head 110.

Figure 2:
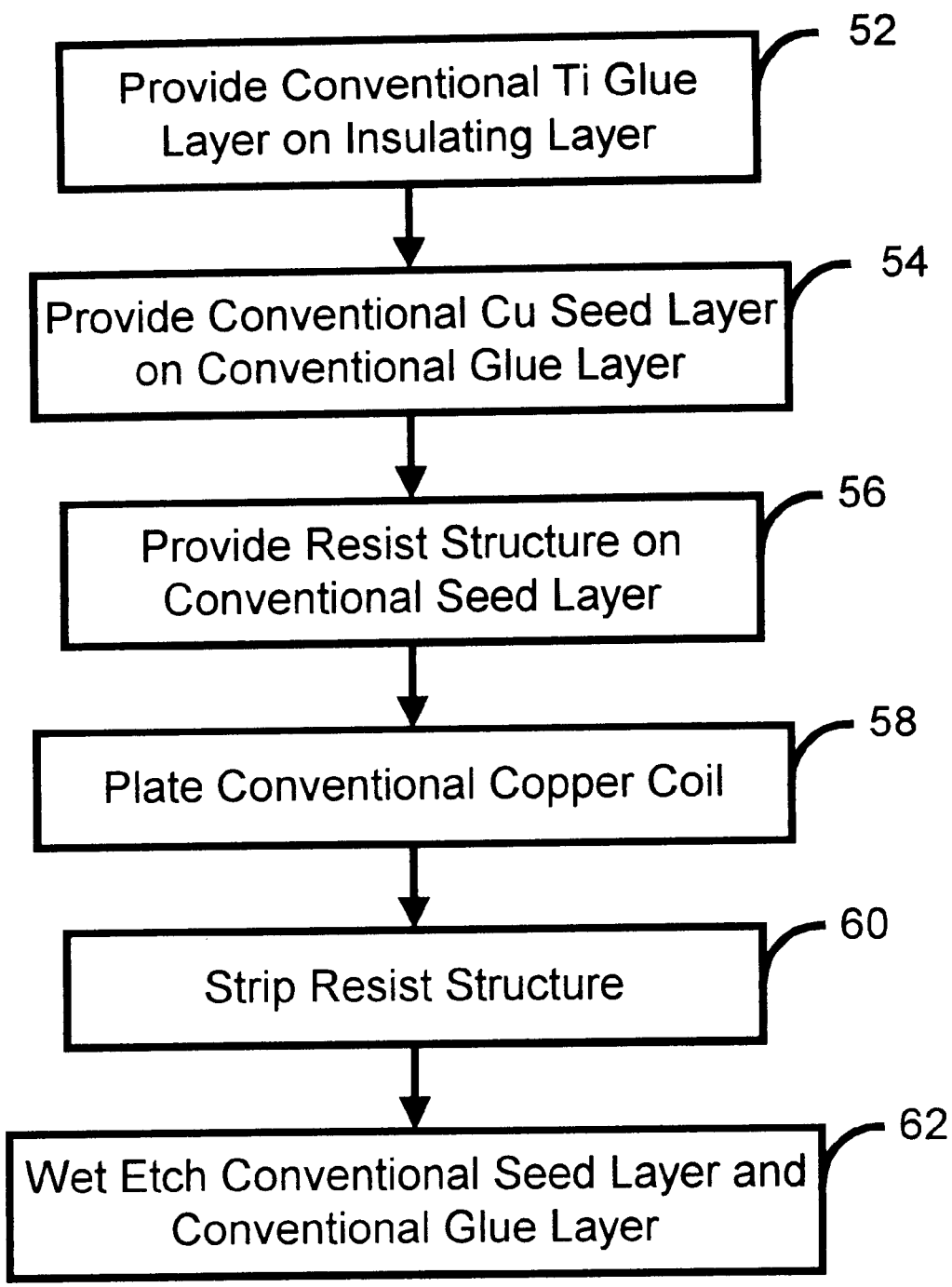
FIG. 2 is a flow chart of a conventional method for providing the write head.
Figure 3A:
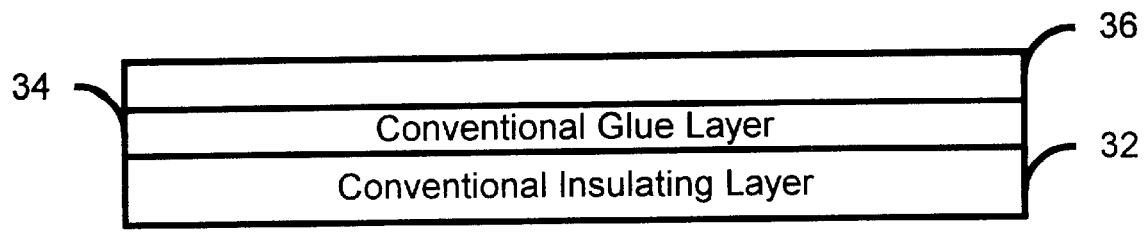
FIG. 3A is a diagram of a portion of the conventional write head after the conventional seed layer is provided.
Figure 3B:
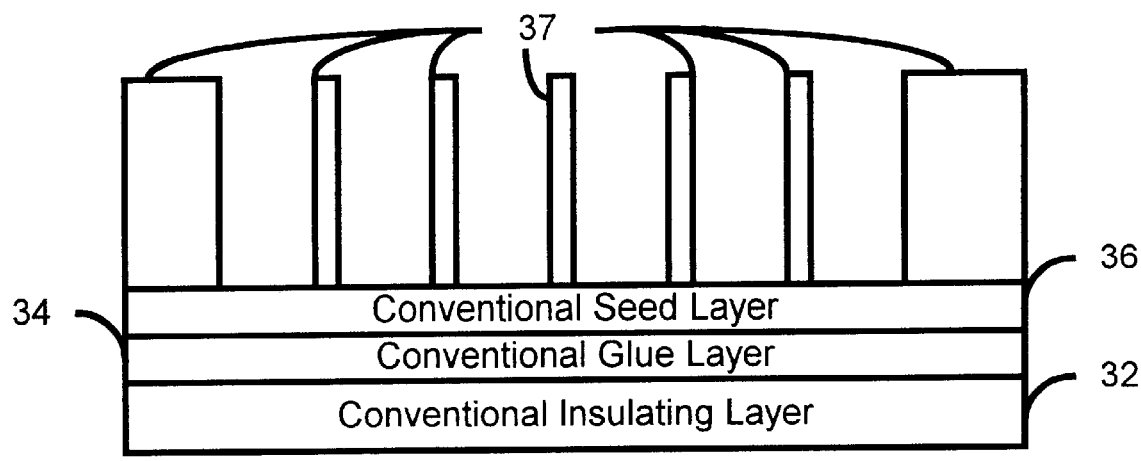
FIG. 3B is a diagram of a portion of the conventional write head after the resist structure is provided.
Figure 3C:
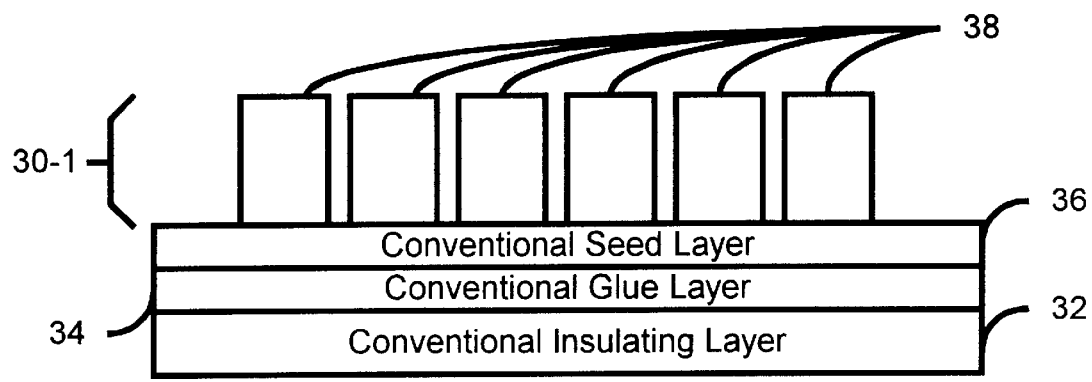
FIG. 3C is a diagram of a portion of the conventional write head after the resist structure had been stripped.
Figure 3D:
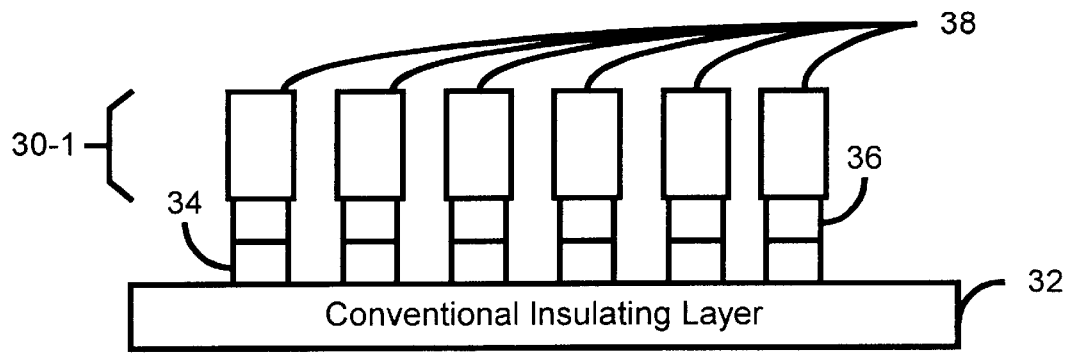
FIG. 3D is a diagram of a portion of the conventional write head after the wet etch of the conventional seed and glue layers.

The seed layers 331 and 325 are preferably significantly thinner than the intermediate layers 330 and 324, respectively. For example, in one embodiment, the intermediate layers 324 and 330 are approximately one thousand Angstroms, while the seed layers 331 and 325 are approximately three hundred Angstroms. In addition, the seed layers 325 and 331 may be wet etched instead of dry etched. However, because the seed layers 325 and 331 are significantly thinner than the intermediate layers 324 and 330, respectively, the wet etch of the thin seed layers 325 and 331 is shorter than in the conventional method 50 depicted in FIG. 2. Referring back to FIGS. 8A and 8B, the intermediate layers 324 and 330 are still dry etched. Thus, although the wet etch for the seed layers 325 and 331 may be used, the reduction in width and height of the conductive layers 326 and 332 is significantly reduced. The intermediate layers 324 and 330 have the same advantages as the intermediate layers 124 and 130, respectively. Thus, a dry etch can be used to etch the intermediate layers 330 and 324. The dry etch can be highly anisotropic and selective. Thus, the combination of a short wet etch and the dry etch results in less undercutting and less reduction in width and height of the conductive layers 326 and 332. Consequently, the data transfer rate and yield can be improved.

Figure 9A:
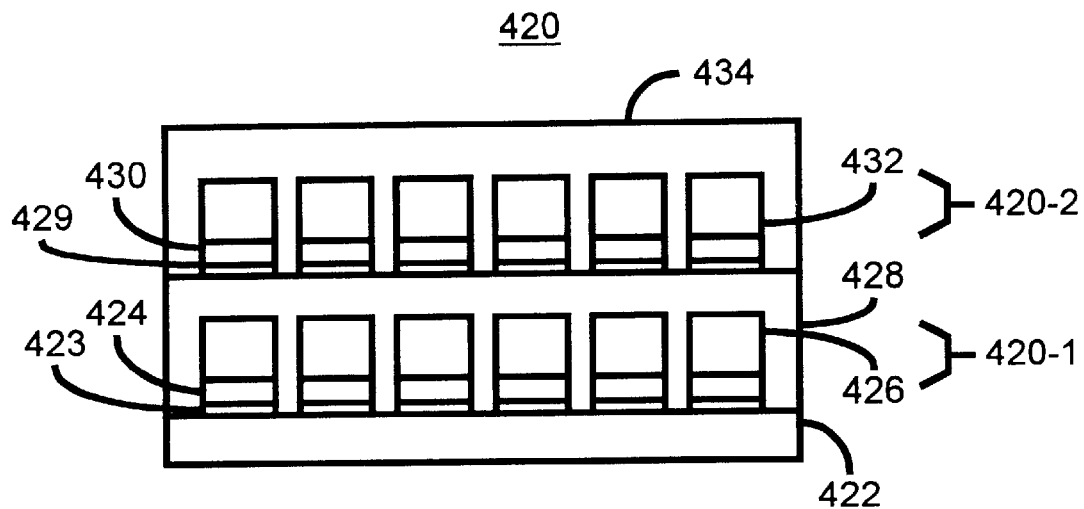
FIG. 9A is a diagram of a portion of a third embodiment of the write head in accordance with the present invention.
Figure 9B:
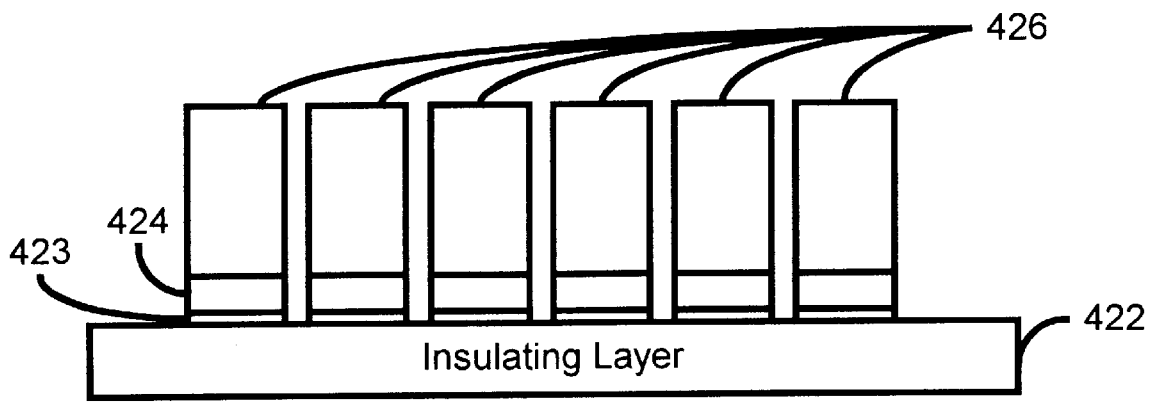
FIG. 9B is a diagram of a portion of the third embodiment of a write head in accordance with the present invention after the dry etch of the intermediate and seed layers.

FIGS. 9A and 9B depict a third embodiment of the coils 420 and a surrounding portion of the write head 110. FIG. 9A depicts coils 420-1 and 420-2. The coils 420-1 and 420-2 include a conductive layer 426 and 432, respectively. The conductive layers 426 and 432 correspond to the conductive layers 126 and 132, respectively. Thus, the conductive layers 426 and 432 are preferably copper. The conductive layers 426 and 432 are formed on intermediate layers 424 and 430. The intermediate layers 424 and 430 correspond to the intermediate layers 124 and 130, respectively. The intermediate layers 424 and 430, however, preferably function only as seed layers. The intermediately layers are grown on glue layers 423 and 429, respectively. Glue layers 423 and 429 are grown on insulating layers 422 and 428, respectively, and aid in adhering the coils 420-1 and 420-2 to the underlying layers. In addition, an insulating layer 434 insulates the coil 420-2 from the remainder of the write head 110.

The glue layers 423 and 429 are preferably significantly thinner than the intermediate layers 424 and 430, respectively. For example, in one embodiment, the intermediate layers 424 and 430 are approximately one thousand Angstroms, while the glue layers 423 and 429 are approximately three hundred Angstroms. In addition, the glue layers 423 and 429 may be wet etched instead of dry etched. However, because the glue layers 423 and 429 are significantly thinner than the intermediate layers 424 and 430, respectively, the wet etch used to etch the thin glue layers 423 and 429 is shorter than in the conventional method 50 depicted in FIG. 2. Referring back to FIGS. 9A and 9B, the intermediate layers 424 and 430 are still dry etched. Thus, although the wet etch for the glue layers 423 and 429 may be used, the reduction in width and height of the conductive layers 426 and 432 is significantly reduced. The intermediate layers 430 and 424 have the same advantages as the intermediate layers 124 and 130, respectively. Thus, a dry etch can be used to etch the intermediate layers 430 and 424. The dry etch can be highly anisotropic and selective. Thus, the combination of a short wet etch and the dry etch results in less undercutting and less reduction in width and height of the conductive layers 426 and 432. Consequently, the data transfer rate and yield can be improved.

A method and system has been disclosed for providing a write head having at least one coil which is subject to reduced etching and reduced undercutting. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A write head including at least one pole for writing magnetic data, the write head also including an insulating layer, the write head comprising:
   at least one conductive coil in proximity to the at least one pole, the at least one conductive coil for carrying a current to energize the at least one pole for writing the magnetic data; and
   an intermediate layer disposed between the insulating layer and the at least one conductive coil, the intermediate layer being composed of at least one material capable of being dry etched; and
   wherein the at least one material of the intermediate layer is WN.

2. The write head of claim 1 wherein the intermediate layer is adjacent to the at least one conductive coil and to the insulating layer; and wherein the intermediate layer functions as a seed layer and a glue layer for the at least one conductive coil.

3. A write head including at least one pole for writing magnetic data, the write head also including an insulating layer, the write head comprising:
   at least one conductive coil in proximity to the at least one pole, the at least one conductive coil for carrying a current to energize the at least one pole for writing the magnetic data; and
   an intermediate layer disposed between the insulating layer and the at least one conductive coil, the intermediate layer being composed of at least one material capable of being dry etched, the intermediate layer having a first thickness; and
   a glue layer disposed between the intermediate layer and the insulating layer, the glue layer having a second thickness, the second thickness being less than the first thickness;
   wherein the intermediate layer acts as a bottom antireflective coating layer for reducing reflections.

4. The write head of claim 3 wherein the intermediate layer is adjacent to the at least one conductive coil and functions as a seed layer for the at least one conductive coil.

5. A write head including at least one pole for writing magnetic data, the write head also including an insulating layer, the write head comprising:
   at least one conductive coil in proximity to the at least one pole, the at least one conductive coil for carrying a current to energize the at least one pole for writing the magnetic data; and
   an intermediate layer disposed between the insulating layer and the at least one conductive coil, the intermediate layer being composed of at least one material capable of being dry etched, the intermediate layer having a first thickness; and
   a seed layer disposed between the intermediate layer and the at least one conductive coil, the seed layer having a second thickness, the second thickness being less than the first thickness;
   wherein the intermediate layer acts as a bottom antireflective coating layer for reducing reflections.

6. The write head of claim 5 wherein the intermediate layer is adjacent to the insulating layer and functions as a glue layer for the at least one conductive coil.

7. The write head of claim 5 wherein the at least one material of the intermediate layer is TiN.

8. The write head of claim 5 wherein a portion of the intermediate layer is removed through an anisotropic reactive ion etch which removes the portion of the intermediate layer substantially without removing any portion of the at least one conductive coil.

9. The write head of claim 8 wherein the reactive ion etch further selectively etches the intermediate layer substantially without etching the at least one coil.

* * * * *